(12) United States Patent
Berry

(10) Patent No.: US 7,226,349 B2
(45) Date of Patent: Jun. 5, 2007

(54) PROCESS TO ELECTRONICALLY AUTOMATE THE SORTING OF CHICKEN FEET IN THE CATEGORY OF EDIBLE OR INEDIBLE

(76) Inventor: Allan Todd Berry, 5441 Britt Whitmire Rd., Gainesville, GA (US) 30506

( * ) Notice: Subject to any disclaimer, the term of this patent is extended or adjusted under 35 U.S.C. 154(b) by 0 days.

(21) Appl. No.: 10/657,977

(22) Filed: Sep. 9, 2003

(65) Prior Publication Data

US 2005/0059332 A1    Mar. 17, 2005

(51) Int. Cl.
    A22C 21/00    (2006.01)
    A22C 21/06    (2006.01)
(52) U.S. Cl. .................... 452/167; 452/166; 452/182
(58) Field of Classification Search ............ 452/150, 452/153, 154, 166, 167, 170, 181, 182, 183, 452/184
    See application file for complete search history.

(56) References Cited

U.S. PATENT DOCUMENTS

| | | | | | |
|---|---|---|---|---|---|
| 3,622,000 | A | * | 11/1971 | McClenny | 209/594 |
| 3,696,464 | A | * | 10/1972 | Dillon et al. | 452/167 |
| 3,781,946 | A | * | 1/1974 | Altenpohl | 452/183 |
| 4,102,015 | A | | 7/1978 | Herrick | |
| 4,150,374 | A | * | 4/1979 | Brook | 340/674 |
| 4,372,099 | A | * | 2/1983 | Linville | 53/415 |
| 4,570,299 | A | * | 2/1986 | Ellis | 452/110 |
| 5,104,352 | A | | 4/1992 | Dransfield | |
| 5,478,990 | A | * | 12/1995 | Montanari et al. | 235/375 |
| 5,498,202 | A | * | 3/1996 | Vande Berg | 452/184 |
| 5,672,100 | A | | 9/1997 | Nielsen et al. | |
| 5,863,244 | A | | 1/1999 | Mansfield et al. | |
| 6,104,966 | A | * | 8/2000 | Haagensen | 700/116 |
| 6,200,210 | B1 | * | 3/2001 | Pratt | 452/52 |
| 6,254,472 | B1 | * | 7/2001 | Meyn | 452/188 |
| 6,283,848 | B1 | | 9/2001 | Berry | |
| 6,546,304 | B2 | * | 4/2003 | Thorvaldsson et al. | 700/115 |
| 6,749,497 | B2 | * | 6/2004 | Haley et al. | 452/167 |
| 2003/0065414 | A1 | * | 4/2003 | van den Nieuwelaar et al. | 700/97 |
| 2003/0139130 | A1 | * | 7/2003 | Steffler et al. | 452/149 |

FOREIGN PATENT DOCUMENTS

DE    4132830    * 4/1993
WO    WO 01/76378    * 10/2001

* cited by examiner

*Primary Examiner*—David Parsley
(74) *Attorney, Agent, or Firm*—Joseph G. Mitchell, Esq.

(57) ABSTRACT

Photoelectric and inductive sensors are placed along a picking and eviscerating chicken lines. The sensors detect the location of a chicken bird in a shackle and its associated feet, also in a shackle. The sensors communicate this information to a programmable logic card. An inspection button also communicates information to the programmable logic card. Medal flags are attached to a shackle to allow for an easier way for the sensors to determine the locations of the chicken bird and its associated feet.

2 Claims, 1 Drawing Sheet

PROCESS TO ELECTRONICALLY AUTOMATE THE SORTING OF CHICKEN FEET IN THE CATEGORY OF EDIBLE OR INEDIBLE

BACKGROUND OF THE INVENTION

1) Field of the Invention

The field of invention relates to a process to electronically sort chicken feet into the category of either edible or inedible. More particularly, the invention utilizes electronic tracking sensors to maintain identity between all processed chickens and their respective feet.

2) Description of Prior Art

While the prior art includes methods and apparatus for performing various poultry processing operations, insofar as the applicants are aware there is no known method that utilizes an electronic tracking system to maintain identity between all processed chickens and their respective feet.

The demand for poultry, and especially chicken feet as a specialty food item, particularly in the Orient, is relatively great. Approximately three hundred tons per month are currently being exported from the United States. However, the supply of poultry feet is limited and the cost is kept relatively high because of the lack of a fully automatic method and apparatus for processing such poultry parts into edible and inedible parts. Conventional practice calls for the poultry feet be sorted into edible and inedible when an inspector, from the USDA or plant quality facility, determines that the chicken is edible or inedible. However, the labor required to manually remove the feet from the conveyor lines subsequent to the inspector's review of the chicken makes the cost of poultry process of the manual method unattractive.

Therefore, it has long been known that it would be desirable to have a method to electronically sort the feet into the category of edible and inedible when the chicken is inspected and determined to be either edible or inedible. The invention thus provides for the processing of poultry in an automatic, dependable and economical fashion so as to permit the sale of such chicken parts at a commercially acceptable price and which has particular utility in the processing of poultry feet.

SUMMARY OF THE INVENTION

Poultry processing facilities utilize motor driven chains to convey whole chickens, (also referred to as whole birds) and chicken feet throughout the facility. Primarily, there are two main types of these chain lines in a facility. The first is the picking line whereby live chickens are hung by their feet, killed, and preprocessed. This is where live chickens are inserted into the process by being hung by their feet in a shackle. There is only one chicken per shackle. After the chickens are preprocessed, the chicken feet are cut and the chickens are separated from their respective feet. The whole birds are then automatically transferred from the picking line to the second type of line commonly called the eviscerating line. This automatic transfer is accomplished using a machine called an automatic rehanger. An automatic rehanger is a machine with "floating" trolleys (or carriers). As the picking line moves, a trolley is picked up and moved at picking line speed. When the chicken feet are cut, the chicken is no longer attached to the picking line. The chicken is then supported by a trolley. The feet from the chicken remain on the shackle on the picking line and are then transported towards the paw or chicken foot harvester for automatic unloading from the picking line for edible or inedible sorting. The trolley on the automatic rehanger is moved towards the eviscerating line. As the eviscerating line moves, a trolley is picked up and moved at eviscerating line speed. As the eviscerating line moves, a trolley is aligned with a shackle on the eviscerating line. The automatic rehanger has an arm that contacts the whole bird, thus forcing it into a shackle on the eviscerating line. Each whole bird is carried through the eviscerating process on the eviscerating line. After the whole birds are opened on the eviscerating line, the birds are then presented to USDA or plant quality inspectors while still suspended from the eviscerating line. The inspector makes a determination as to the edible or inedible status of the whole bird and thusly the respective feet.

With the foregoing background, the applicants' invention comprises an industrial programmable logic controller (PLC) receiving input data from photoelectric and inductive sensors located at various locations on the picking and eviscerating lines. The PLC has been programmed with an electronic model of the process. The photoelectric sensors monitor line movement and verify presence of chickens in shackles. The inductive sensors monitor trolley movement on the automatic rehanger. These sensors send signals back to the PLC via data bus communications. The PLC interprets the sensor data and updates the internal electronic model. Each sensor has diagnostics built-in them and will alert the PLC of a malfunction. If the system detects a malfunction, it will automatically fail to a safe position, thus rejecting all feet as inedible. Each chicken or whole bird and associated chicken feet are assigned a memory location in the PLC, which will follow the chicken and associated chicken feet throughout the process. The process uses the sensors to verify the tracking calibration is correct.

A primary feature of the invention is that it maintains synchronization between the shackle location of the chicken feet and the shackle location of the whole bird. The system verifies the synchronization at various points throughout the process.

Photoelectric sensors placed on the picking line detect the presence of whole chickens on the shackles. If a chicken is detected on a shackle, a unique electronic identification tag (ID) is assigned to the chicken's shackle location. As the picking line moves, the photoelectric sensors detect shackles passing in front of its location and the electronic model in the PLC is updated as to the new position. As a given chicken arrives at the entrance to the automatic rehanger, it is separated from its feet and picked up by a trolley on the rehanger. When the trolley picks up the chicken, an inductive sensor verifies that a trolley was present at the transition point and transfers the chicken ID to the automatic rehanger model. As the trolley is moved through the automatic rehanger, its position is tracked continuously. When the trolley reaches the point at which the chickens are transferred to the eviscerating line, a second inductive sensor detects the trolley. At this point, the chicken ID is transferred from the automatic rehanger model to the eviscerating line model. The automatic rehanger model uses metal flags mounted on each trolley, except for one, to count the trolleys passing above the inductive proximity sensors. The one trolley that does not have the flag is used to maintain synchronization between the actual positions of the trolleys and the trolley positions in the automatic rehanger electronic model. As the eviscerating line moves, the photoelectric sensors detect shackles passing in front of its location and the electronic model in the PLC is updated as to the new position. Directly after the chicken is transferred to the eviscerating line, a set of photoelectric sensors is positioned to detect the presence of the whole birds. The photoelectric sensors compares which chickens successfully were transferred to the eviscerating line verses the electronic model in the PLC.

The system also monitors the presence of the chickens directly before the inspector station locations. Another set of photoelectric sensors compares which chickens are detected at this point to the electronic model in the PLC. When the whole birds pass the inspectors, a determination is made as to whether the feet from that chicken are edible or inedible. If the chicken feet are edible, no action is taken by the inspector. If no action is taken by the operator and the chicken feet from the bird in front of the inspector are not "Unknown", the chicken feet will be sorted to the edible bin. If the chicken feet are determined to be inedible, the inspector will press a button located at the inspector's station. This button interfaces with the system and then the system identifies the ID of the whole bird and locates its associated chicken feet on the picking line. The status of the chicken feet will be electronically set to "Inedible".

The key to the invention being able to constantly identify the whole bird and the chicken feet relies on the number of line shackles between tracking points so that the electronic model will exactly match the actual process.

The system of the subject invention automatically verifies the number of line shackles each time the chains make a revolution through the process. There are large metal flags attached to one shackle on each picking line and eviscerating line. As this flag passes different points monitored by the system, the electronic model is verified against the actual line data measured by the photoelectric sensors and is changed if some line stretch has occurred.

The invention resides not in any one of these features per se, but rather in the particular combination of all of them herein disclosed and claimed, and it is distinguished from the prior art in this particular combination of all its structures for the functions specified.

There has thus been outlined, rather broadly, the important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved process to electronically automate the sorting of chicken feet in the category of edible or inedible.

Another object of the present invention is to provide such a method and apparatus which permits the processing of poultry parts and particularly poultry feet at a reasonable cost.

Another object is to provide such a method and apparatus that can easily be integrated into existing poultry processing lines to operate cooperatively therewith.

Another object is to provide such a method and apparatus that operate rapidly, automatically identify edible and inedible chicken feet.

Another object is to provide such a method and apparatus that are well suited for use with existing methods of sanitation and waste disposal in commercial poultry processing plants.

Further objects and advantages are to provide improved elements and arrangements thereof in an apparatus for the purposes described which are dependable, economical, durable and fully effective in accomplishing its intended purposes.

These together with other objects of the invention, along with the various features of novelty that characterize the invention, are pointed out with particularity in the claims annexed to and forming a part of this disclosure. For a better understanding of the invention, its operating advantages and the specific objects attained by its use, reference should be had to accompanying drawing and descriptive matter that is illustrated the preferred embodiment of the invention.

BRIEF DESCRIPTION OF THE DRAWINGS

The invention will be better understood based on the following detailed description. Such description makes reference to the annexed drawing wherein.

DESCRIPTION OF THE PREFERRED EMBODIMENT

Figure 1:
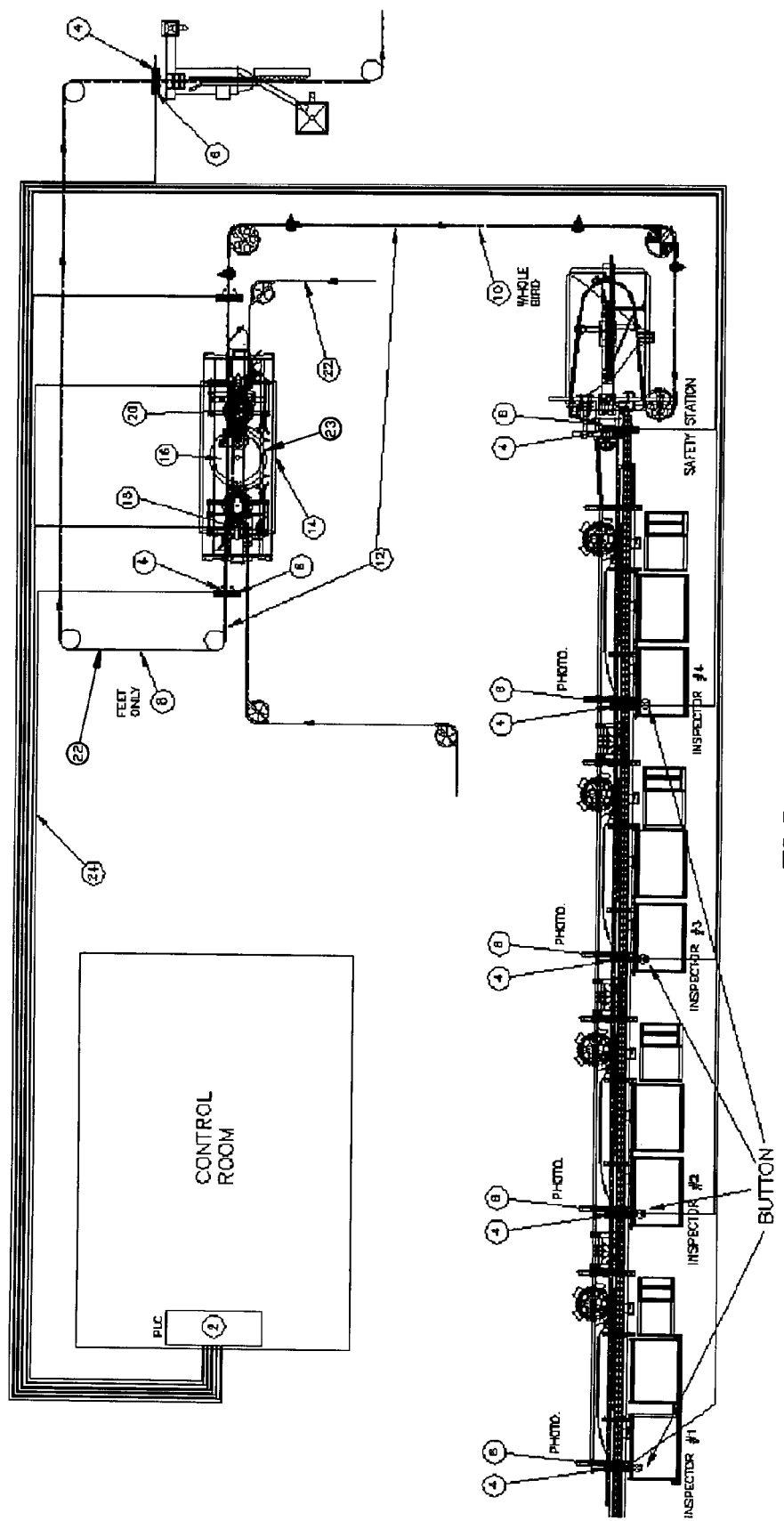
FIG. 1 shows a diagrammatic view of the invention.

With reference now to the drawing, and in particular FIG. 1, the applicants' invention comprises an industrial programmable logic controller (PLC) 2 receiving input data from photoelectric sensors 4 and inductive sensors 6 located at various locations on the picking lines 8 and eviscerating lines 10. The PLC 2 has been programmed with an electronic model of the process. The photoelectric sensors 4 monitor line movement and verify presence of chickens in shackles. The inductive sensors 6 monitor trolley movement on the automatic rehanger. These photoelectric sensors 4 and inductive sensors 6, send signals back to the PLC 2 via data bus communications 24. The PLC 2 interprets the sensor data and updates the internal electronic model. Each sensor has diagnostics built-in them and will alert the PLC 2 of a malfunction. If the system detects a malfunction, it will automatically fail to a safe position, thus rejecting all feet as inedible.

A primary feature of the invention is that it maintains synchronization between the shackle 12 location of the chicken feet and the shackle 12 location of the whole bird. If a whole bird is removed from its shackle 12 location, then the synchronization between the chicken feet and the whole bird will be lost. The system verifies the synchronization at various points throughout the process. If the synchronization is lost, the electronic status of the chicken feet will be set to "Unknown". "Unknown" feet are rejected into the inedible bin when they past through the paw or chicken feet harvester because a positive determination cannot be made as to the edible or inedible status of such feet.

Photoelectric sensors 4 placed on the picking line 8 detect the presence of whole chickens on the shackles 12. If a chicken is detected on a shackle 12, a unique electronic identification tag (ID) is assigned to the chicken's shackle 12 location. If a shackle 12 does not contain a chicken, the shackle 12 location is assigned as an empty shackle and tracked throughout the process. As the picking line 8 moves, the photoelectric sensors 4 detect shackles 12 passing in front of its location and the electronic model in the PLC 2 is updated as to the new position. As a given chicken arrives at the entrance to the automatic rehanger 14, it is separated from its feet and picked up by a trolley 16 on the rehanger 14. When the trolley 16 picks up the chicken, an inductive proximity sensor 18 verifies that a trolley 16 was present at the transition point and transfers the chicken ID to the automatic rehanger 14 model. If a whole bird did not get picked up by a trolley 16, and therefore did not get transferred to the automatic rehanger 14, the status of the feet for that chicken will be set to "Untracked". As the trolley 16 is moved through the automatic rehanger 14, its position is tracked continuously. When the trolley 16 reaches the point at which the chickens are transferred to the eviscerating line 10, a second inductive proximity sensor 20 detects the trolley 16. At this point, the chicken ID is transferred from the automatic rehanger 14 model to the eviscerating line model. The automatic rehanger 14 model uses metal flags 22 mounted on each trolley 16, except for one, to count the trolleys 16 passing above the inductive proximity sensors. The one trolley 16 that does not have the flag is used to maintain synchronization between the actual positions of the trolleys 16 and the trolley positions in the automatic rehanger 14 model. As the eviscerating line 10 moves, the photoelectric sensors 4 detect shackles 12 passing in front of its location and the electronic model in the PLC 2 is updated as to the new position. Directly after the chicken is transferred to the eviscerating line 10, a set of photoelectric sensors 4 is positioned to detect the presence of the whole birds. Because the automatic rehanger 14 will typically fail to successfully transfer about 5% of the whole birds, this set of photoelectric sensors 4 compares which chickens successfully were transferred to the eviscerating line 10 verses the electronic model in the PLC 2. If a given whole bird was not successfully transferred to the correct eviscerating line 10 shackle 12, the system will electronically set the status of the feet that came from that whole bird to "Unknown". The system also monitors the presence of the chickens directly before the inspector station locations. Another set of photoelectric sensors 4 compares which chickens are detected at this point to the electronic model in the PLC 2. If a given whole bird is not present and the electronic model shows that a whole bird should be on that shackle 12, the system will electronically set the status of the feet that came from that whole bird to "Unknown". If the picking line 8 stops running and the eviscerating line 10 continues to run, the feet from any given bird may reach the paw or chicken feet harvester before the whole birds have been graded by the inspectors. Because these feet have to be unloaded, the status of the feet whose whole bird have not yet passed by the inspector stations will also be electronically set to "Unknown". When the whole birds pass the inspectors, a determination is made as to whether the feet from that chicken are edible or inedible. If the feet are edible, no action is taken by the inspector. If no action is taken by the operator and the feet from the bird in front of the inspector are not "Unknown", the feet will be sorted to the edible bin. If the feet are determined to be inedible, the inspector will press a button located at their station. This button interfaces with the system and then the system identifies the ID of the whole bird and locates its feet on the picking line. The status of the feet will be electronically set to "Inedible". The key to the invention being able to constantly identify the whole bird and the chicken feet relies on the number of line shackles 12 between tracking points so that the electronic model will exactly match the actual process.

Additionally, due to the fact that the picking line 8 and the eviscerating line 10 are chains, some wear and stretch will occur over time. The subject invention automatically corrects for this issue by verifying the number of line shackles 12 each time the chains make a revolution through the process. There are large metal flags 22 attached to one shackle 12 on each picking line 8 and eviscerating line 10. As this metal flag 22 passes different points monitored by the system, the electronic model is verified against the actual line data measured by the photoelectric sensors 4 and is changed if some line stretch has occurred.

With respect to the above description then, it is to be realized that the optimum dimensional relationships for the invention to include variations in size, materials, shape, form, function and manner of operation, assembly and use, are deemed readily apparent and obvious to one skilled in the art, and all equivalent relationships to those skilled in the art, and all equivalent relationships to those illustrated in the drawings and described in the specification are intended to be encompassed by the present invention.

Thus, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An apparatus to electronically automate the sorting of chicken feet in the category of edible or inedible, comprising:
    sensors including at least one photoelectric sensor and at least one inductive sensor for tracking a whole chicken bird less its chicken feet in at least one first shackle of a plurality of first shackles on an eviscerating line and only said chicken feet separate from said whole chicken bird in at least one second shackle of a plurality of second shackles on a picking line;
    a programmable logic card to track and store information received by said sensors;
    a means to communicate between said sensors and said programmable logic card;
    at least one inspector reject button communicating with said programmable logic card;
    an automatic rehanger including a plurality of trolleys, a a metal flag on each trolley of said plurality of trolleys except one located between said picking line and said eviscerating line, wherein said at least one photoelectric sensor is adapted to detect the presence of said whole chicken bird and said chicken feet on said picking line and said eviscerating line, and wherein said at least one inductive sensor is adapted to detect the presence of said whole chicken bird and said chicken feet on said at least one trolley on said automatic rehanger;
    a first large metal flag on only one first shackle of said plurality of first shackles; and
    a second large metal flag on only one second shackle of said plurality of second shackles.

2. A process to electronically automate the sorting of chicken feet in the category of edible or inedible, comprising:

sensing, with at least one photoelectric sensor and at least one inductive sensor, for tracking a whole chicken bird less its chicken feet in at least one first shackle of a plurality of first shackles on an eviscerating line and only said chicken feet separate from said whole chicken bird in at least one second shackle of a plurality of second shackles on a picking line;

using a programmable logic card to track and store information received by said sensors;

communicating by a communication means between said sensors and said programmable logic card;

employing at least one inspector reject button communicating with said programmable logic card;

employing an automatic rehanger including a plurality of trolleys, a metal flag on each trolley of said plurality of trolleys except one located between said picking line and said eviscerating line, wherein said at least one photoelectric sensor is adapted to detect the presence of said whole chicken bird and said chicken feet on said picking line and said eviscerating line, and wherein said at least one inductive sensor is adapted to detect the presence of said whole chicken bird and said chicken feet on said at least one trolley on said automatic rehanger;

using a first large metal flag on only one first shackle of said plurality of first shackles; and using a second large metal flag on only one second shackle of said plurality of second shackles.

\* \* \* \* \*